(12) United States Patent
Fujimoto et al.

(10) Patent No.: US 11,960,275 B2
(45) Date of Patent: Apr. 16, 2024

(54) AUTONOMOUS MOVING APPARATUS AND NON-TRANSITORY COMPUTER READABLE MEDIUM

(71) Applicant: FUJIFILM Business Innovation Corp., Tokyo (JP)

(72) Inventors: Hideki Fujimoto, Kanagawa (JP); Hajime Kajiyama, Kanagawa (JP); Xiongfan Jin, Kanagawa (JP); Tetsuya Kobayashi, Kanagawa (JP); Mariko Miyazaki, Kanagawa (JP); Teppei Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 428 days.

(21) Appl. No.: 16/681,842

(22) Filed: Nov. 13, 2019

(65) Prior Publication Data

US 2020/0159208 A1 May 21, 2020

(30) Foreign Application Priority Data

Nov. 21, 2018 (JP) ................................. 2018-218185

(51) Int. Cl.
*G05D 1/00* (2006.01)
*B60Q 5/00* (2006.01)
*G05D 1/02* (2020.01)

(52) U.S. Cl.
CPC ............ *G05D 1/0011* (2013.01); *B60Q 5/005* (2013.01); *G05D 1/0088* (2013.01); *G05D 1/0276* (2013.01)

(58) Field of Classification Search
CPC .......................... G05D 1/0011; G05D 1/0033
See application file for complete search history.

(56) References Cited

U.S. PATENT DOCUMENTS

| 7,551,980 B2 | 6/2009 | Sakagami et al. |
| 10,556,339 B2 | 2/2020 | Fujimoto et al. |

(Continued)

FOREIGN PATENT DOCUMENTS

| CN | 102663429 | 9/2012 |
| CN | 105955251 | 9/2016 |

(Continued)

OTHER PUBLICATIONS

"Office Action of Japan Counterpart Application", dated Sep. 6, 2022, with English translation thereof, p. 1-p. 5.

(Continued)

*Primary Examiner* — Russell Frejd
*Assistant Examiner* — Sara J Lewandroski
(74) *Attorney, Agent, or Firm* — JCIPRNET

(57) ABSTRACT

An autonomous moving apparatus includes a moving unit that moves the autonomous moving apparatus, a detector that detects distances from surrounding objects and shapes of the surrounding objects, a notifying unit that notifies surrounding persons, and a controller that controls the moving unit so that the autonomous moving apparatus moves so as to follow movement of a person recognized as a follow target by the detector and, when the person recognized as the follow target performs a specific action, controls the notifying unit to give a notification by a preset notification method in response to the specific action.

9 Claims, 11 Drawing Sheets

(56) References Cited

U.S. PATENT DOCUMENTS

| | | | |
|---|---|---|---|
| 10,562,184 B2 | 2/2020 | Yamamoto et al. | |
| 11,279,031 B2 | 3/2022 | Fujimoto et al. | |
| 2004/0199292 A1 | 10/2004 | Sakagami et al. | |
| 2018/0333862 A1* | 11/2018 | Hayashi | A63H 13/005 |
| 2021/0209332 A1* | 7/2021 | Nishio | G06V 40/10 |
| 2021/0232148 A1* | 7/2021 | Sui | G05D 1/0297 |

FOREIGN PATENT DOCUMENTS

| | | | |
|---|---|---|---|
| CN | 106155065 | | 11/2016 |
| CN | 106843215 | | 6/2017 |
| CN | 107390721 | | 11/2017 |
| CN | 107577229 | | 1/2018 |
| CN | 107688779 | | 2/2018 |
| JP | 2002116792 | | 4/2002 |
| JP | 2004-126800 | | 4/2004 |
| JP | 2004299025 | | 10/2004 |
| JP | 2014-164315 | | 9/2014 |
| JP | 2014164315 A | * | 9/2014 |
| JP | 2015001778 | | 1/2015 |
| JP | 2018005653 | | 1/2018 |
| JP | 2018005654 | | 1/2018 |
| WO | 2018106719 | | 6/2018 |

OTHER PUBLICATIONS

"Notice of Reasons for Refusal of Japan Counterpart Application", dated Jan. 24, 2023, with English translation thereof, p. 1-p. 5.
"Office Action of Japan Counterpart Application", dated May 9, 2023, with English translation thereof, p. 1-p. 5.
"Office Action of China Counterpart Application", dated May 30, 2023, with English translation thereof, pp. 1-27.

* cited by examiner (TAKE STEPS)

(TURN STEERED WHEELS TO RIGHT AND LEFT)

AUTONOMOUS MOVING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-218185 filed Nov. 21, 2018.

BACKGROUND

(i) Technical Field

The present disclosure relates to an autonomous moving apparatus and a non-transitory computer readable medium.

(ii) Related Art

Japanese Unexamined Patent Application Publication No. 2004-126800 discloses a transportation robot that is equipped with a valuable article storage, follows a transporter, and includes a controller that controls the valuable article storage so that a valuable article may be taken out when an authenticating part authenticates an operator.

Japanese Unexamined Patent Application Publication No. 2014-164315 discloses an automatic transportation apparatus that detects motion of a user in front of the user while being kept out of contact with the user and moves ahead of the user in accordance with a walk of the user based on an output through the detection.

SUMMARY

Aspects of non-limiting embodiments of the present disclosure relate to an autonomous moving apparatus and a non-transitory computer readable medium storing a program, in which an operator may confirm whether the operator is recognized as a follow target before the autonomous moving apparatus actually moves so as to follow movement of the operator.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an autonomous moving apparatus comprising a moving unit that moves the autonomous moving apparatus, a detector that detects distances from surrounding objects and shapes of the surrounding objects, a notifying unit that notifies surrounding persons, and a controller that controls the moving unit so that the autonomous moving apparatus moves so as to follow movement of a person recognized as a follow target by the detector and, when the person recognized as the follow target performs a specific action, controls the notifying unit to give a notification by a preset notification method in response to the specific action.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described in detail with reference to the drawings.

Figure 1:
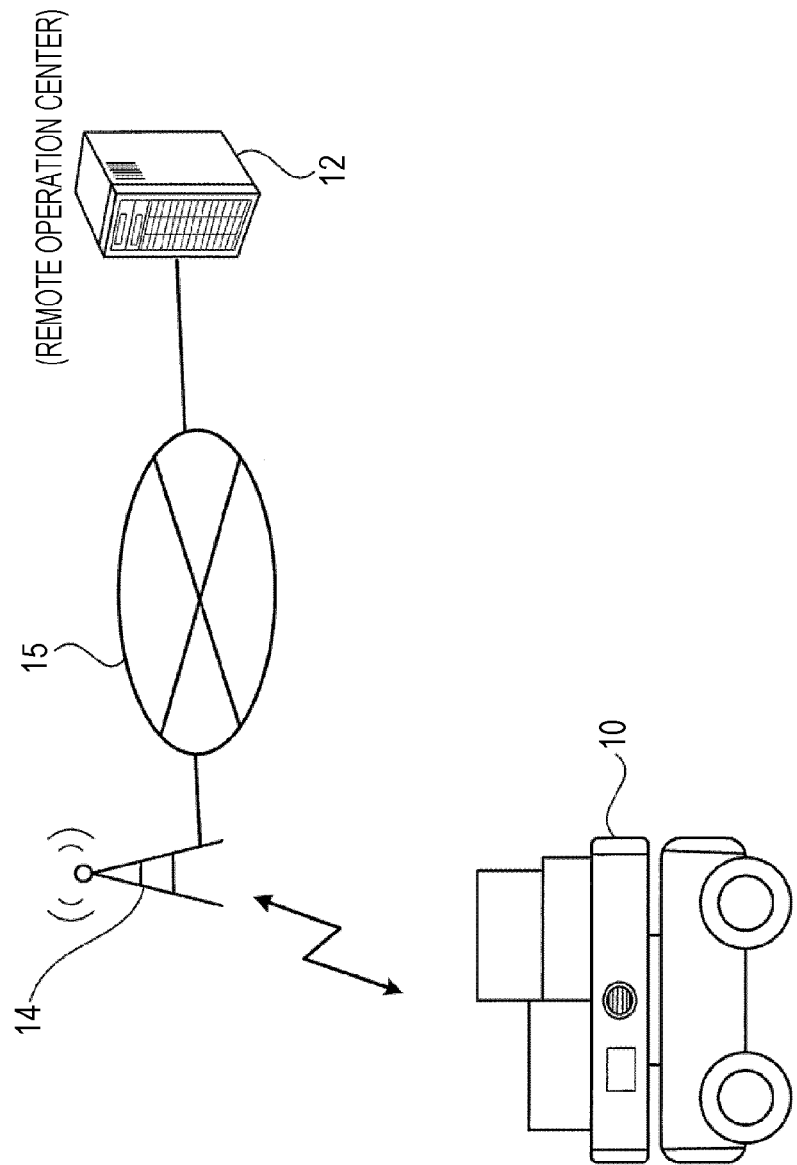
FIG. 1 illustrates the configuration of a system that uses an autonomous moving apparatus of an exemplary embodiment of the present disclosure.

FIG. 1 illustrates the configuration of a system that uses an autonomous moving apparatus 10 of the exemplary embodiment of the present disclosure.

As illustrated in FIG. 1, the system that uses the autonomous moving apparatus 10 of the exemplary embodiment of the present disclosure includes the autonomous moving apparatus 10 and a server 12 installed in a remote operation center where the autonomous moving apparatus 10 is remotely operated.

The autonomous moving apparatus 10 includes a moving unit that moves the autonomous moving apparatus. The moving unit enables the autonomous moving apparatus to autonomously move so as to follow movement of a follow target 1 corresponding to a person to be followed. The term "follow" means that the autonomous moving apparatus autonomously moves ahead of or behind the recognized follow target 1 in response to the movement of the follow target 1.

Specifically, the autonomous moving apparatus 10 may detect motion of hands and legs of the follow target 1 to operate in any operation mode out of a follow mode in which the autonomous moving apparatus 10 moves behind the follow target 1, a lead mode in which the autonomous moving apparatus 10 moves ahead of the follow target 1, and a stop mode in which the autonomous moving apparatus 10 stops its movement.

The follow mode is an operation mode in which the autonomous moving apparatus 10 moves behind the leading follow target. The lead mode is an operation mode in which the autonomous moving apparatus 10 moves ahead of the follow target.

The autonomous moving apparatus 10 is provided with a follow mode button, a lead mode button, and a stop button. A user may switch the operation modes of the autonomous moving apparatus 10 by operating those buttons.

This exemplary embodiment is described taking an example in which the autonomous moving apparatus 10 includes a carriage, the carriage is loaded with a package such as a packing box, and the autonomous moving apparatus 10 moves ahead of or behind the follow target 1 such as a delivery person who collects and delivers the package or stops the movement.

For example, the autonomous moving apparatus 10 and the server 12 are mutually connected via a cellular communication network 14 and the Internet 15. The autonomous moving apparatus 10 is remotely operable based on an instruction from the server 12 of the remote operation center. For example, when the autonomous moving apparatus 10 has lost the follow target 1 and stopped its movement, the autonomous moving apparatus 10 transmits a report of the stop to the server 12 and is recovered by moving to a nearby distribution center based on a movement instruction from the server 12.

Figure 2:
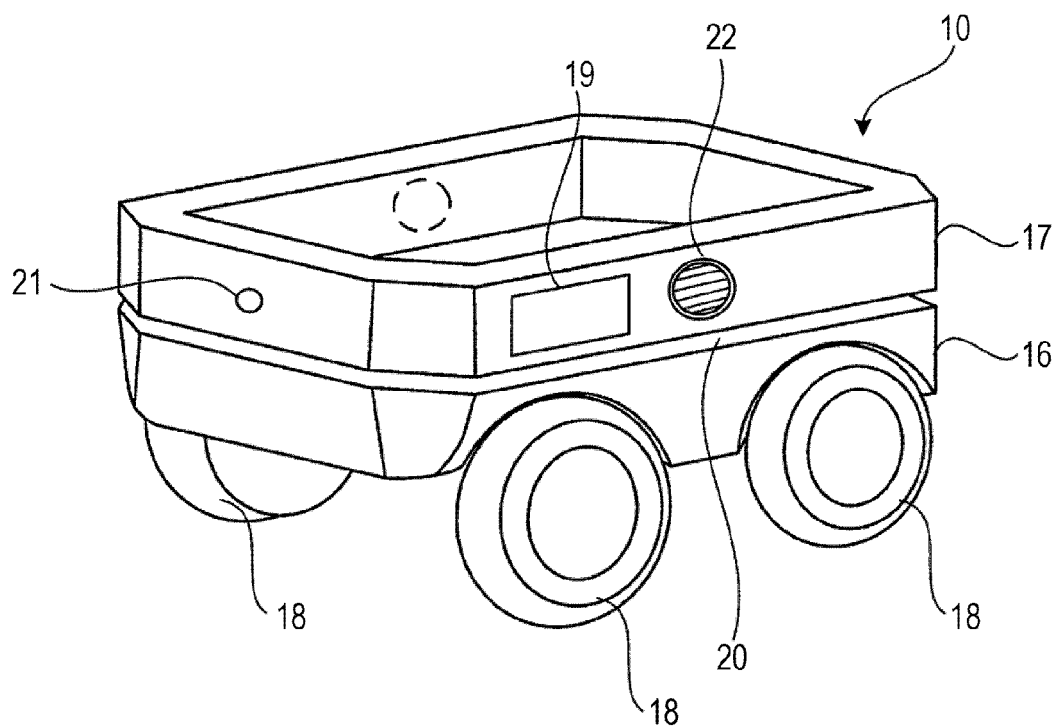
FIG. 2 is a perspective view illustrating an appearance of the autonomous moving apparatus of the exemplary embodiment of the present disclosure.

Next, the structure of the autonomous moving apparatus 10 is described. FIG. 2 is a perspective view illustrating an appearance of the autonomous moving apparatus 10.

The autonomous moving apparatus 10 includes an apparatus body 16, a carriage 17, moving mechanisms 18 that move the apparatus body 16, a touch panel 19, a sensor 20 serving as a detector, LED indicators 21, and loudspeakers 22.

The carriage 17 is provided above the apparatus body 16 and is loaded with a package such as a packing box.

The sensor 20 is provided between the apparatus body 16 and the carriage 17 and detects distances from and shapes of objects located in 360 degrees around the autonomous moving apparatus. Specifically, the sensor 20 is a laser rangefinder (laser distance sensor) that detects a distance from an object by using laser light and detects distances from and shapes of objects located around the autonomous moving apparatus by using a technology called Laser Imaging, Detection, and Ranging (LIDAR).

Two LED indicators 21 are provided on the front and rear of the apparatus body 16 and notify the follow target of some information by emitting light. Two loudspeakers 22 are provided on the right and left of the apparatus body 16 and notify the follow target of some information by emitting sound.

The moving mechanisms 18 are provided below the apparatus body 16 and cause the autonomous moving apparatus to move so as to follow movement of the follow target 1 that is detected by the sensor 20. Specifically, the moving mechanism 18 includes a wheel, a motor serving as a drive source that drives the wheel, and an actuator and a hydraulic pump that control a steering angle and a brake of a steered wheel.

Figure 3:
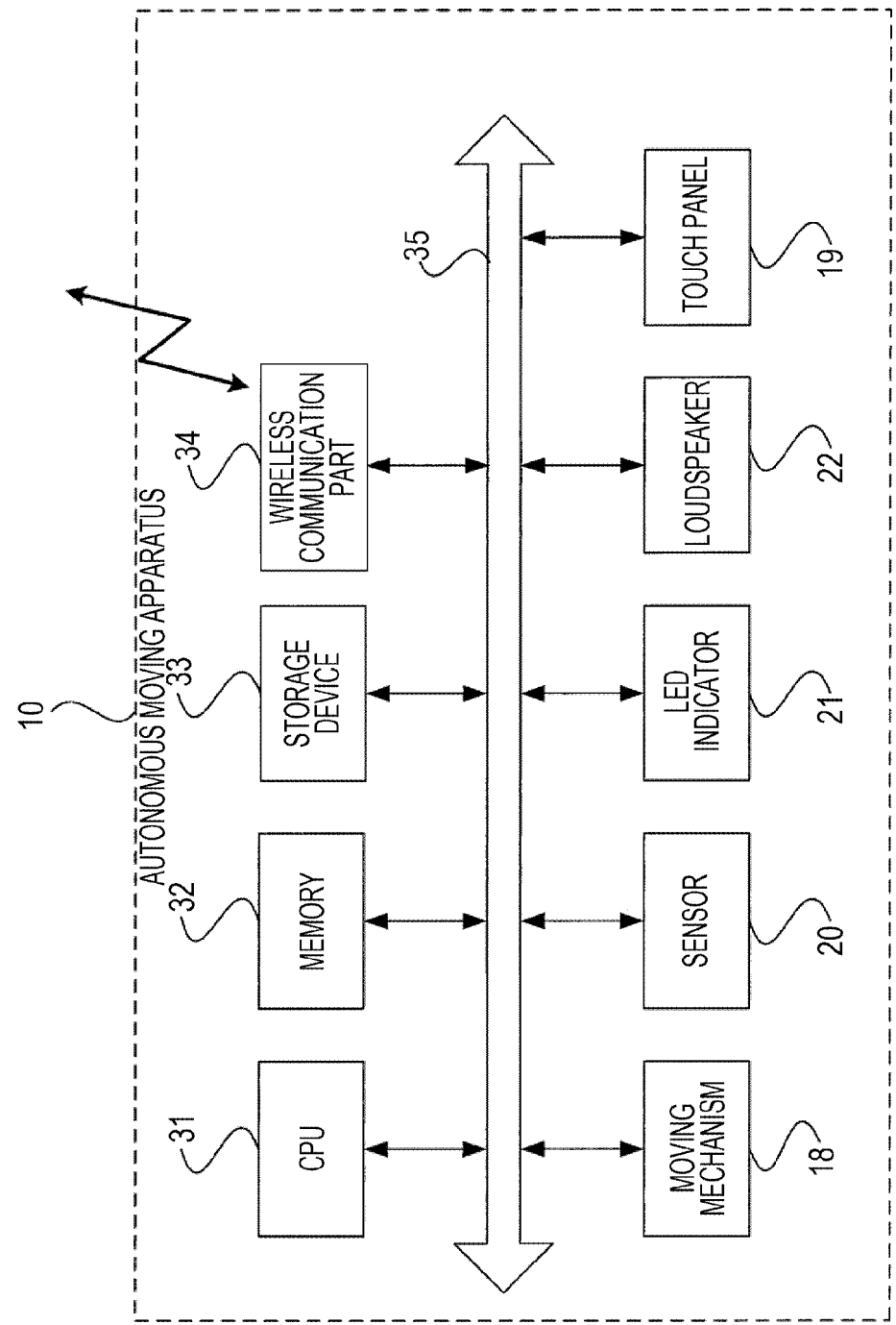
FIG. 3 is a block diagram illustrating the hardware configuration of the autonomous moving apparatus of the exemplary embodiment of the present disclosure.

FIG. 3 is a block diagram illustrating the hardware configuration of the autonomous moving apparatus 10.

As illustrated in FIG. 3, the autonomous moving apparatus 10 includes a CPU 31, a memory 32, a storage device 33, a wireless communication part 34, the moving mechanism 18, the touch panel 19, the sensor 20, the LED indicator 21, and the loudspeaker 22. Those components are connected together via a control bus 35.

The CPU 31 executes predetermined processing based on a control program stored in the memory 32 or the storage device 33 to control an operation of the autonomous moving apparatus 10. The wireless communication part 34 transmits and receives data between the wireless communication part 34 and the cellular communication network 14 via a wireless network. This exemplary embodiment is described under the assumption that the CPU 31 reads and executes the control program stored in the memory 32 or the storage device 33 but the program may be provided to the CPU 31 by being stored in a storage medium such as a CD-ROM.

Figure 4:
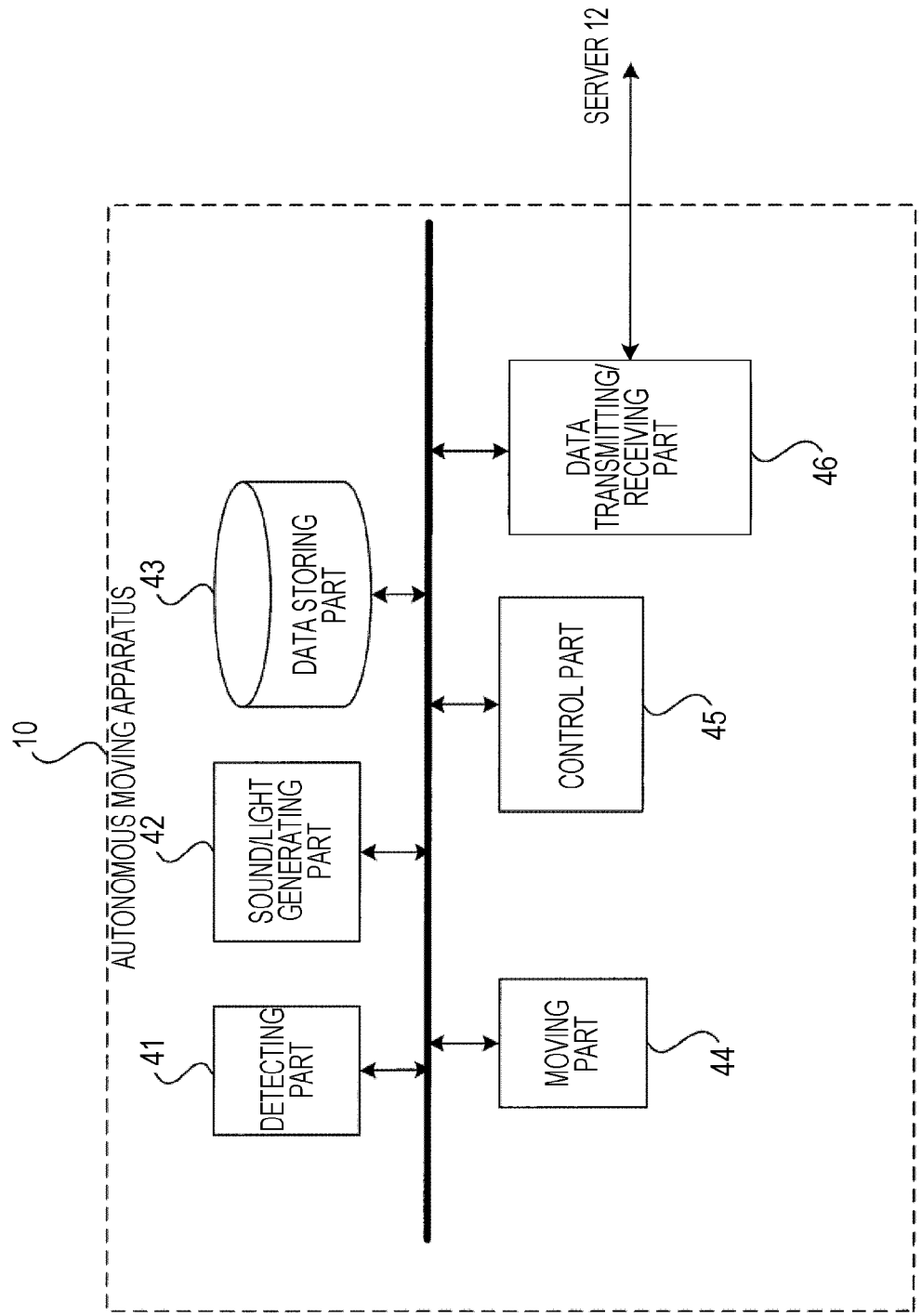
FIG. 4 is a block diagram illustrating the functional configuration of the autonomous moving apparatus of the exemplary embodiment of the present disclosure.

FIG. 4 is a block diagram illustrating the functional configuration of the autonomous moving apparatus 10 that is implemented by executing the control program described above.

As illustrated in FIG. 4, the autonomous moving apparatus 10 of this exemplary embodiment includes a detecting part 41, a sound/light generating part 42, a data storing part 43, a moving part 44, a control part 45, and a data transmitting/receiving part 46.

The data transmitting/receiving part 46 transmits and receives data between the data transmitting/receiving part 46 and the server 12 based on control of the control part 45.

The detecting part 41 detects distances from and shapes of surrounding objects. Specifically, the detecting part 41 detects distances from and shapes of objects near the ground on the periphery, including the feet of the follow target 1.

The moving part 44 is a moving unit that moves the autonomous moving apparatus. Based on control of the control part 45, the moving part 44 causes the autonomous moving apparatus to move so as to follow movement of the follow target 1 that is detected by the detecting part 41.

The control part 45 controls the moving part 44 so that the autonomous moving apparatus moves so as to follow movement of a person recognized as the follow target by the detecting part 41. Specifically, the control part 45 controls the moving part 44 so that the autonomous moving apparatus moves so as to follow movement of the follow target in the follow mode or the lead mode described above.

The control part 45 controls a direction of the steered wheel and a rotation speed of a drive wheel of the moving mechanisms 18 so that the autonomous moving apparatus moves so as to follow movement of the person recognized as the follow target by the detecting part 41 based on a distance from and a direction of the follow target while maintaining a constant distance between the follow target and the autonomous moving apparatus.

States of the autonomous moving apparatus 10 that moves in the follow mode and the lead mode are described with reference to FIGS. 5A and 5B.

Figure 5A:
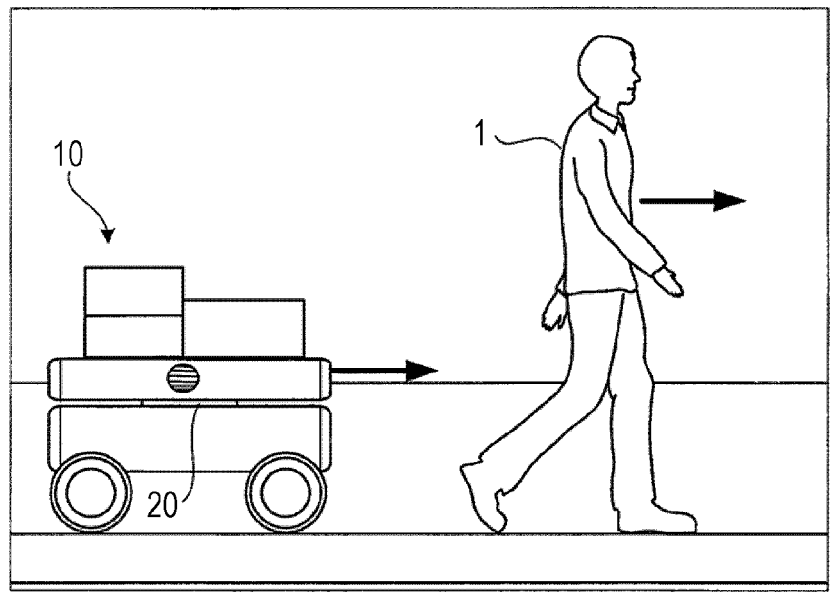
FIGS. 5A and 5B illustrate states of the autonomous moving apparatus that moves in a follow mode and a lead mode.
Figure 5B:
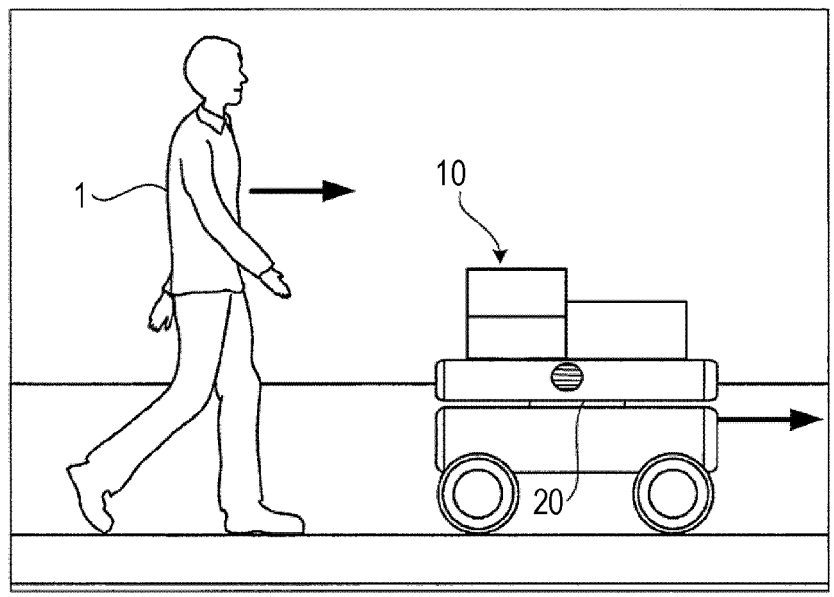

FIG. 5A illustrates a state in which the autonomous moving apparatus 10 is moving behind the follow target 1 in the follow mode. FIG. 5B illustrates a state in which the autonomous moving apparatus 10 is moving ahead of the follow target 1 in the lead mode.

In the follow mode illustrated in FIG. 5A, the autonomous moving apparatus 10 moves behind the follow target 1 while maintaining a preset distance. In the lead mode illustrated in FIG. 5B, the autonomous moving apparatus 10 moves ahead of the follow target 1 while maintaining a preset distance.

The sound/light generating part 42 is a notifying unit that notifies a person around the autonomous moving apparatus of some information by generating sound or light. The sound includes not only a human voice but also a beeping sound or a buzzer sound.

The control part 45 performs movement control over the moving part 44 and, when the person recognized as the follow target performs an identification action that is a specific action, controls the notifying unit such as the sound/light generating part 42 to give a notification by a preset notification method in response to the specific action. Specifically, the control part 45 gives a notification that the specific action of the person recognized as the follow target is recognized by a response action to the identification action performed by the person recognized as the follow target.

The notifying unit that notifies the surrounding person is not limited to the sound/light generating part 42 but includes any other means for signaling or responding to the surrounding person. For example, the notifying unit may be the steered wheels. In this case, the control part 45 notifies the person recognized as the follow target by operating the steered wheels in response to the specific action performed by the person recognized as the follow target.

Specifically, when the person recognized as the follow target performs the specific action, the control part 45 may notify the person recognized as the follow target by turning the steered wheels to right and left without moving the autonomous moving apparatus by the moving part 44. Further, the control part 45 may achieve such a response action that the position of the autonomous moving apparatus 10 is hardly shifted by wiggling four wheels back and forth.

Specifically, the steered wheels are two front wheels of the moving mechanisms 18 illustrated in FIG. 2 and are wheels that change the moving direction of the autonomous moving apparatus 10.

If the sound/light generating part 42 is used as the notifying unit, the control part 45 notifies the person recognized as the follow target by operating the sound/light generating part 42 in response to the specific action performed by the person recognized as the follow target.

The data storing part 43 stores various types of data for controlling movement of the autonomous moving apparatus based on control of the control part 45. The data storing part 43 prestores an action of a person in association with a notification method to be used when the action is detected. Specifically, the data storing part 43 stores an identification action for identification of the follow target in association with a response action to be performed when the identification action is performed by the follow target.

When the action of the person identified as the follow target by the detecting part 41 matches the identification action stored in the data storing part 43, the control part 45 controls the notifying unit such as the sound/light generating part 42 or the steered wheels to give a notification that the person who performs the identification action is recognized as the follow target by performing the response action associated with the identification action.

The control part 45 may not only use the identification action preregistered in the data storing part 43 but also register an action of the person detected by the detecting part 41 in the data storing part 43 as a new identification action.

In order to detect the distance from the follow target and the action of the follow target, the detecting part 41 detects a distance from and the shape of the vicinity of the foot of the follow target. Therefore, the detecting part 41 detects an action of the foot of the person recognized as the follow target as the action of the person recognized as the follow target.

If the follow target moves during the identification action, the autonomous moving apparatus 10 may fail to detect the identification action. Therefore, it is appropriate that the action of the foot of the person be an action to be performed by the follow target without movement. Specifically, an action such as stepping, jumping on both feet, or hopping on one foot to be performed by up and down motion of a foot (feet) in place without movement may be used as the identification action.

Next, operations of the autonomous moving apparatus 10 of this exemplary embodiment are described in detail with reference to the drawings.

First, an overall operation of the autonomous moving apparatus 10 from recognition of the follow target to the start of follow movement is described with reference to a flowchart of FIG. 6.

First, when a user who intends to transport a package or the like by using the autonomous moving apparatus 10 depresses the follow mode button or the lead mode button on the touch panel 19, the user is detected by the detecting part 41 and is recognized as a follow target (Step S101).

If the follow target is recognized properly ("yes" in Step S102), the control part 45 gives a recognition completion notification that the recognition has been performed properly by, for example, generating sound or light by the sound/light generating part 42 (Step S103).

Then, the user operates the touch panel 19 to select identification confirmation actions for confirming whether the user is recognized as the follow target (Step S104). Details of the selection of identification confirmation actions are described later.

When the series of processing operations is completed, the autonomous moving apparatus 10 starts to move so as to follow movement of the person recognized as the follow target (Step S105).

Figure 6:
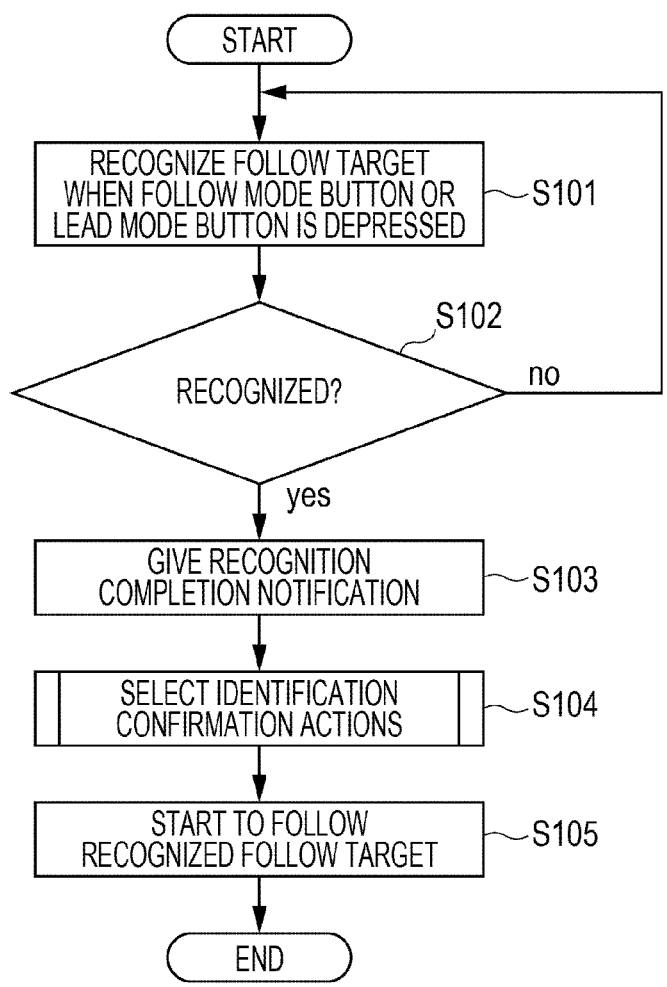
FIG. 6 is a flowchart for illustrating an overall operation of the autonomous moving apparatus from recognition of a follow target to the start of follow movement.

Next, details of the processing of selecting identification confirmation actions in Step S104 of the flowchart of FIG. 6 are described with reference to a flowchart of FIG. 7.

Figure 8:
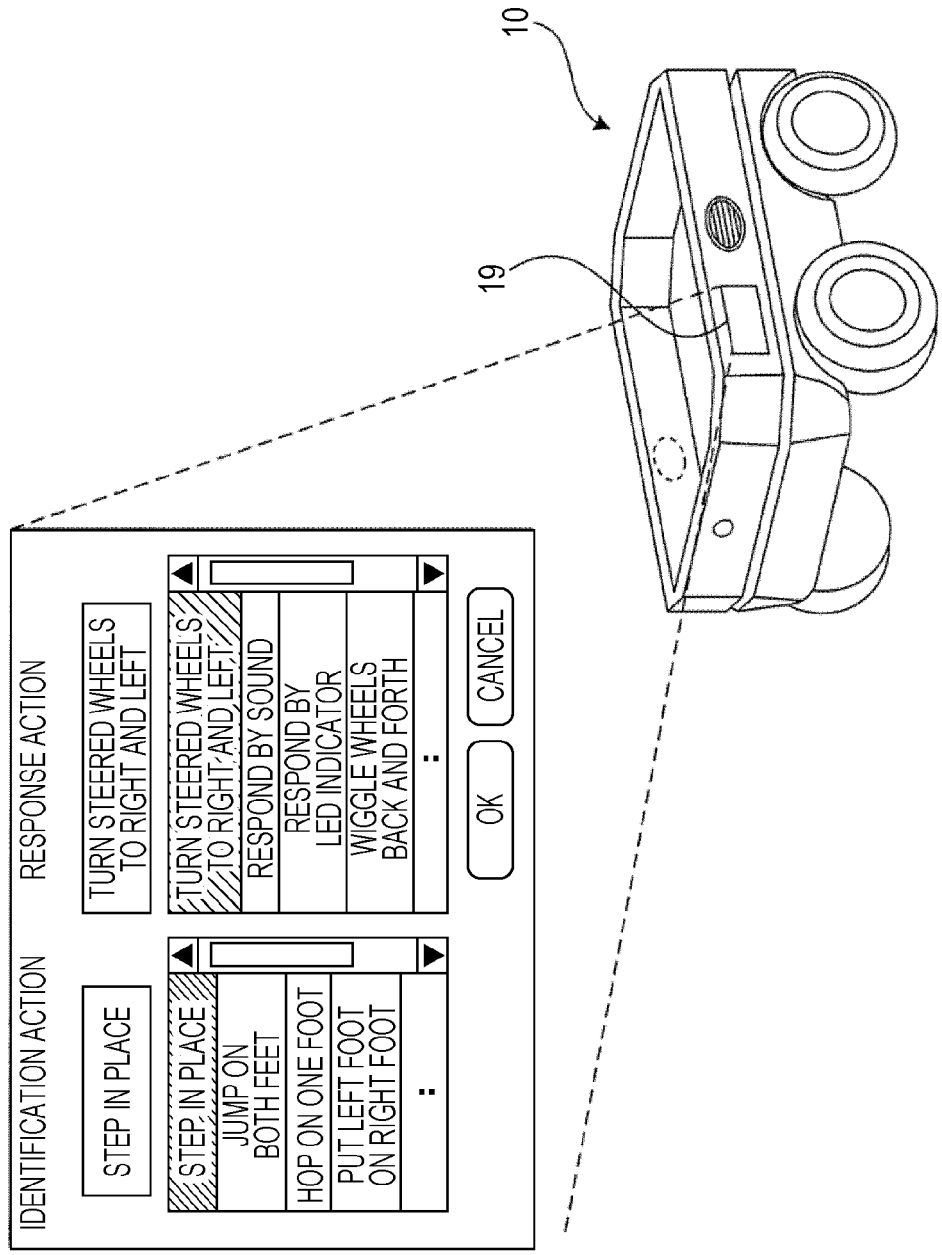
FIG. 8 illustrates an example of an operation screen to be displayed on a touch panel when the processing of selecting identification confirmation actions is performed.

FIG. 8 illustrates an example of an operation screen to be displayed on the touch panel 19 of the autonomous moving apparatus 10 when the processing of selecting identification confirmation actions is performed.

In FIG. 8, the identification action and the response action are selectable independently. In FIG. 8, an action "STEP IN PLACE" is preselected as a preset identification action and an action "TURN STEERED WHEELS TO RIGHT AND LEFT" is preselected as a preset response action.

In the processing of selecting identification confirmation actions, if the user uses the set of the preset identification action and the preset response action ("yes" in Step S201), the user depresses an "OK" button to cause the autonomous moving apparatus 10 to proceed to a recognition confirmation mode for confirming whether the identification action is recognized and the response action is performed (Step S205).

If the user does not use the set of the preset identification action and the preset response action ("no" in Step S201), the user selects one identification action out of a plurality of displayed identification actions (Step S202). Then, the user selects one response action out of a plurality of displayed response actions (Step S203).

Then, the set of the identification action and the response action selected by the user is registered as preset actions (Step S204).

Then, the autonomous moving apparatus 10 proceeds to the recognition confirmation mode for confirming whether the identification action is recognized and the response action is performed (Step S205).

The recognition confirmation mode is an operation mode for confirming whether the user is properly recognized as the follow target before the actual start. When the user who is supposed to be recognized as the follow target performs the identification action selected through the selection processing described above and the autonomous moving apparatus 10 performs the response action set in association with the identification action, the user may confirm that the user is properly recognized as the follow target.

Figure 9:
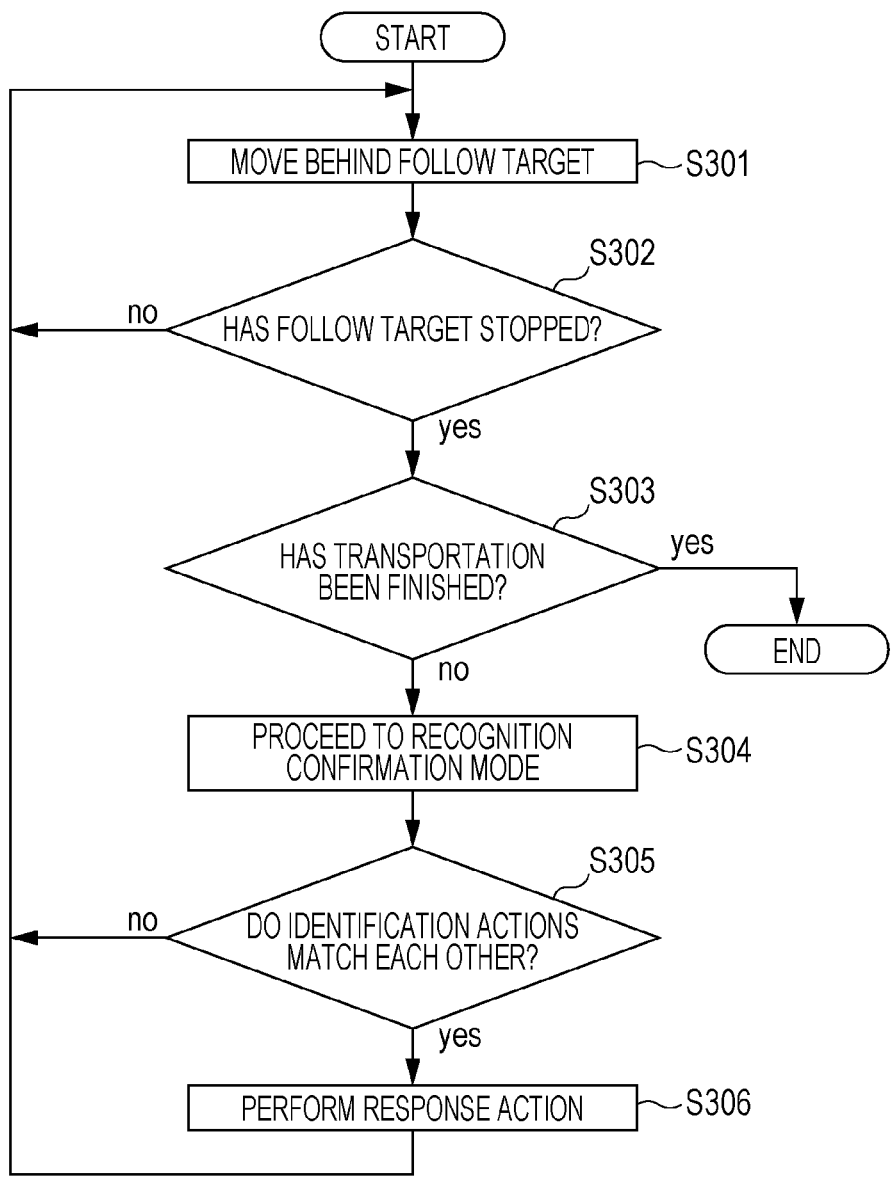
FIG. 9 is a flowchart for illustrating processing to be performed by the autonomous moving apparatus when the autonomous moving apparatus follows a user recognized as the follow target.

Next, processing to be performed by the autonomous moving apparatus 10 when the autonomous moving apparatus 10 follows the user recognized as the follow target is described with reference to a flowchart of FIG. 9.

If the autonomous moving apparatus 10 is moving so as to follow movement of the follow target (Step S301) but the follow target has stopped ("yes" in Step S302) and if the user has given an instruction to stop movement because of the finish of transportation of the package or the like, the follow movement is terminated ("yes" in Step S303). If the follow target has stopped ("yes" in Step S302) and if the transportation of the package or the like has not been finished ("no" in Step S303), the autonomous moving apparatus 10 proceeds to the recognition confirmation mode (Step S304).

Figure 7:
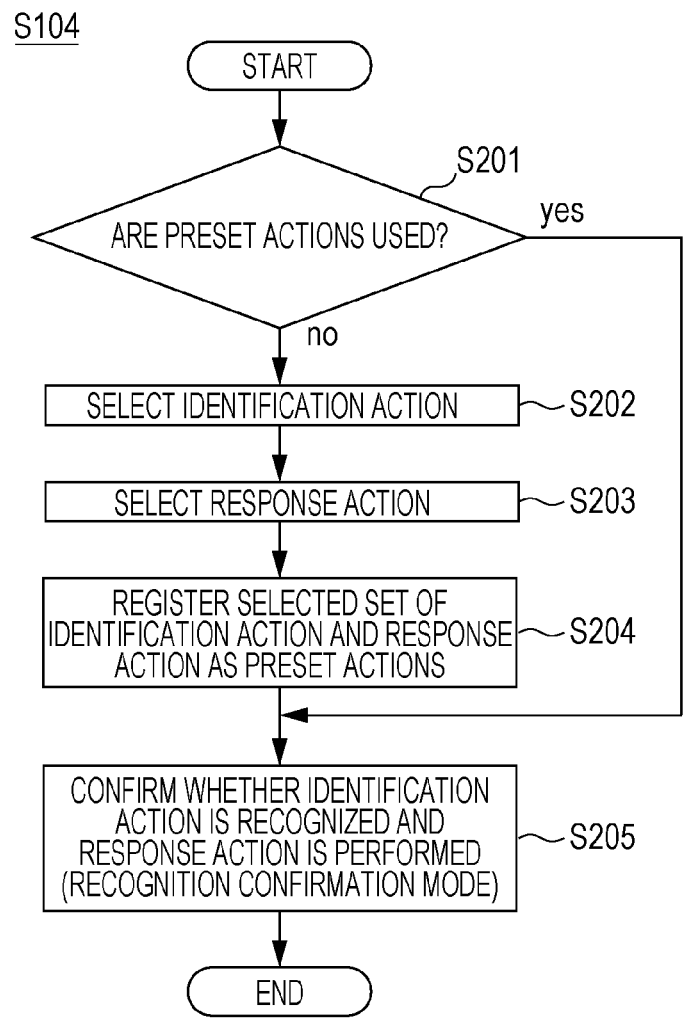
FIG. 7 is a flowchart for illustrating details of processing of selecting identification confirmation actions in Step S104 of the flowchart of FIG. 6.

This recognition confirmation mode is a mode for confirming whether the user is properly recognized as the follow target similarly to the recognition confirmation mode described in the flowchart of FIG. 7 (Step S205).

If the identification action performed by the follow target matches the preset specific identification action in the recognition confirmation mode ("yes" in Step S305), the control part 45 performs the response action associated with the identification action (Step S306).

For example, if the action "STEP IN PLACE" is set as the identification action and the action "TURN STEERED WHEELS TO RIGHT AND LEFT" is set as the response action as illustrated in FIG. 8 and if the action performed by the follow target matches the action "STEP IN PLACE", the control part 45 performs the response action "TURN STEERED WHEELS TO RIGHT AND LEFT".

FIGS. 10A to 10C and FIGS. 11A to 11C illustrate specific examples of the case in which the response action is performed.

Figure 10A:
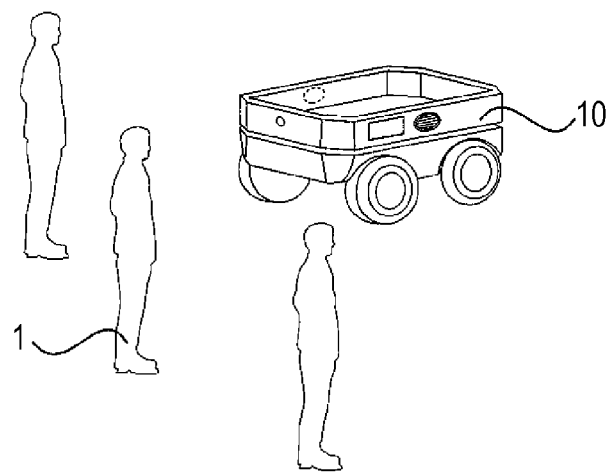
FIGS. 10A to 10C illustrate an example of a response action to be performed by the autonomous moving apparatus.
Figure 10B:
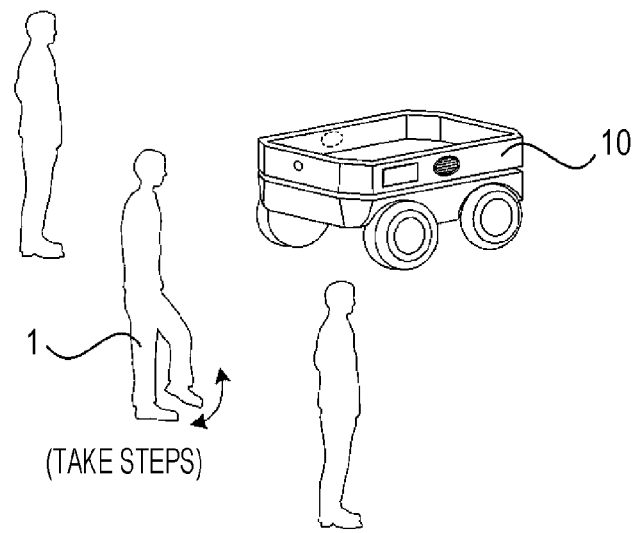
Figure 10C:
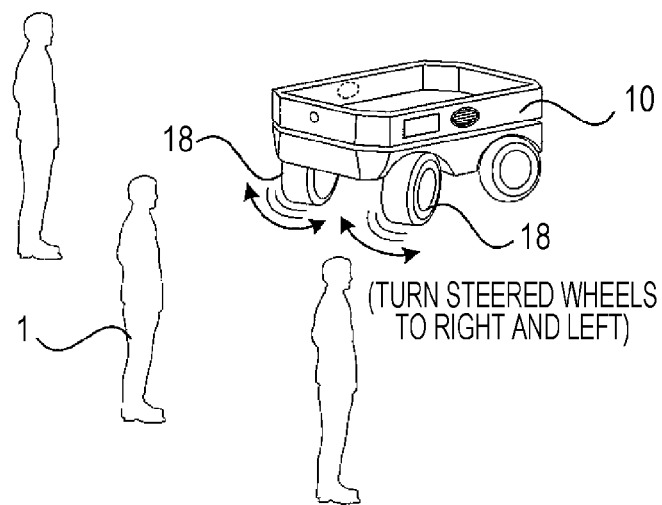

FIGS. 10A to 10C illustrate an operation example in which the action "STEP IN PLACE" is set as the identification action and the action "TURN STEERED WHEELS TO RIGHT AND LEFT" is set as the response action.

If three users are present in front of the autonomous moving apparatus 10 as illustrated in FIG. 10A, the follow target 1 may want to confirm whether the follow target 1 is recognized properly. When the follow target 1 takes steps as illustrated in FIG. 10B, the autonomous moving apparatus 10 determines that the follow target 1 has performed the preregistered identification action.

Then, as illustrated in FIG. 10C, the autonomous moving apparatus 10 performs the response action "TURN STEERED WHEELS TO RIGHT AND LEFT" registered in association with the identification action. Therefore, the follow target 1 may confirm that the follow target 1 is recognized properly before the start of movement.

Figure 11A:
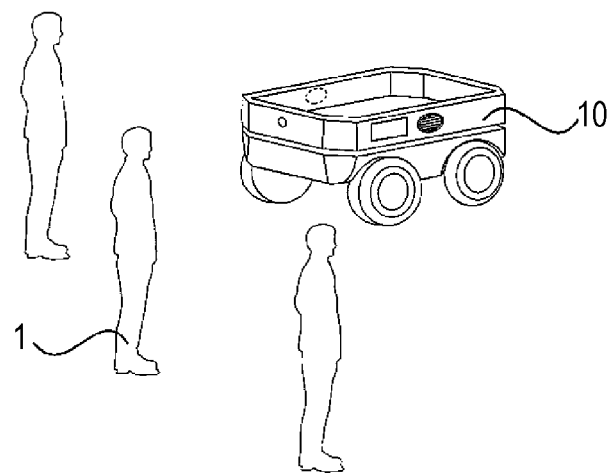
FIGS. 11A to 11C illustrate an example of the response action to be performed by the autonomous moving apparatus.

Next, an operation example in which the action "STEP IN PLACE" is set as the identification action and actions "RESPOND BY LED INDICATOR" and "RESPOND BY SOUND" are set as the response actions is described with reference to FIGS. 11A to 11C.

Figure 11B:
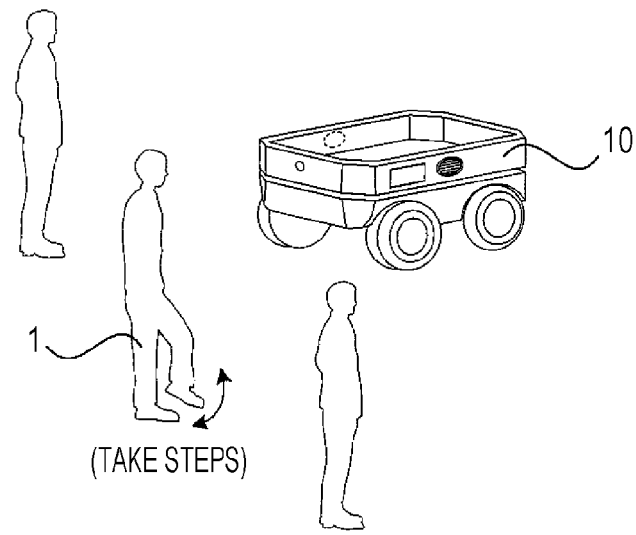

When the follow target 1 takes steps as illustrated in FIG. 11B, the autonomous moving apparatus 10 determines that the follow target 1 has performed the preregistered identification action. Then, as illustrated in FIG. 11C, the autonomous moving apparatus 10 performs the response actions "RESPOND BY LED INDICATOR" and "RESPOND BY SOUND" registered in association with the identification action. Specifically, the LED indicator 21 illuminates or blinks and the loudspeaker 22 outputs preset sound.

Figure 11C:
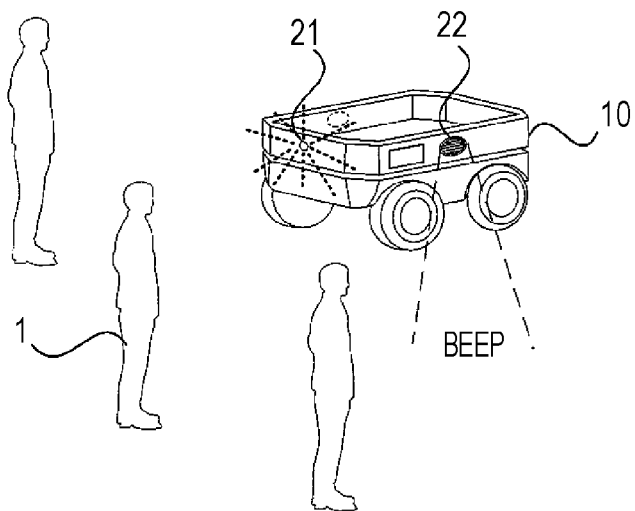

The sound output may be not only an output of a beeping sound illustrated in FIG. 11C but also an output of a voice of a word or phrase such as "I RECOGNIZE YOU AS FOLLOW TARGET."

The exemplary embodiment described above is directed to the case in which the user is notified that the user is recognized as the follow target by performing the response action to the specific identification action. The exemplary embodiment of the present disclosure is not limited to this case. For example, the exemplary embodiment of the present disclosure is applicable to a notification method in which the user recognized as the follow target is notified that the user is recognized as the follow target by providing a plurality of LED indicators in the autonomous moving apparatus 10 and performing control for switching the LED indicators that illuminate based on the moving direction of the follow target.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An autonomous moving apparatus, comprising:
    a moving unit that moves the autonomous moving apparatus;
    a detector that detects distances from surrounding objects and shapes of the surrounding objects;
    a notifying unit that notifies a person recognized as a follow target by the detector; and
    a processor configured to control the moving unit and switch an operation of the moving unit between a following mode and a lead mode,
    wherein in the following mode, the moving unit is controlled by the processor so that the autonomous moving apparatus moves so as to follow movement of the person recognized as a follow target by the detector, and when the person recognized as the follow target performs a specific action, control the notifying unit to give a notification that the specific action of the person recognized as the follow target is recognized by performing a response action associated with the specific action,
    in the lead mode, the moving unit is controlled by the processor so that the autonomous moving apparatus moves so as ahead of the follow target while maintaining a preset distance,
    wherein the notifying unit is a steered wheel,
    when the person recognized as the follow target performs the specific action, the processor further configured to give a notification that the specific action of the person recognized as the follow target is recognized to the person recognized as the follow target by turning the steered wheel to right and left without moving the autonomous moving apparatus by the moving unit.

2. The autonomous moving apparatus according to claim 1, further comprising a memory that prestores an action of a person in association with a notification method to be used when the action is detected, wherein, when the action of the person identified as the follow target by the detector matches the action stored in the memory, the processor further configured to control the notifying unit to give a notification that the specific action of the person recognized as the follow target is recognized by the notification method associated with the action.

3. The autonomous moving apparatus according to claim 2, further comprising a registering unit that newly registers the action of the person detected by the detector in the memory.

4. The autonomous moving apparatus according to claim 1, wherein the action of the person is an action of a foot of the person recognized as the follow target by the detector.

5. The autonomous moving apparatus according to claim 4, wherein the action of the foot of the person is stepping to be performed by up and down motion of the foot in place without movement.

6. The autonomous moving apparatus according to claim 1, wherein the notifying unit is a light emitting unit or a sound outputting unit, and wherein, when the person recognized as the follow target performs the specific action, the processor further configured to give a notification that the specific action of the person recognized as the follow target is recognized to the person recognized as the follow target by operating the light emitting unit or the sound outputting unit.

7. The autonomous moving apparatus according to claim 1, wherein the processor further configured to recognize the follow target in response to selected either one of the following mode and the lead mode by the processor.

8. An autonomous moving apparatus, comprising:

moving means for moving the autonomous moving apparatus;

detecting means for detecting distances from surrounding objects and shapes of the surrounding objects;

notifying means for notifying a person recognized as a follow target by the detector; and control means for, switching between a following mode and a lead mode, in response to the following mode, controlling the moving means so that the autonomous moving apparatus moves so as to follow movement of the person recognized as a follow target by the detecting means and, when the person recognized as the follow target performs a specific action, controlling the notifying means to give a notification that the specific action of the person recognized as the follow target is recognized by performing a response action associated with the specific action, in response to the lead mode, controlling the moving means so that the autonomous moving apparatus moves so as ahead of the follow target while maintaining a preset distance, wherein the notifying means is a steered wheel, when the person recognized as the follow target performs the specific action, the control means further gives a notification that the specific action of the person recognized as the follow target is recognized to the person recognized as the follow target by turning the steered wheel to right and left without moving the autonomous moving apparatus by the moving means.

9. A non-transitory computer readable medium storing a program causing a computer to execute a process, the process comprising:

switching an operation of a moving unit between a following mode and a lead mode;

in response to the following mode, controlling the moving unit so that an autonomous moving apparatus moves so as to follow movement of a person recognized as a follow target by a detector that detects distances from surrounding objects and shapes of the surrounding objects;

controlling, when the person recognized as the follow target performs a specific action, a notifying unit that notifies the person recognized as a follow target by the detector so that a notification that the specific action of the person recognized as the follow target is recognized is given by performing a response action associated with the specific action; and in response to the lead mode, controlling the moving unit so that the autonomous moving apparatus moves so as ahead of the follow target while maintaining a preset distance, where the notifying unit is a steered wheel, when the person recognized as the follow target performs the specific action, giving a notification that the specific action of the person recognized as the follow target is recognized to the person recognized as the follow target by turning the steered wheel to right and left without moving the autonomous moving apparatus by the moving unit.

* * * * *